March 14, 1961     E. R. MAKELA     2,974,358
CUTTER MEANS FOR BALLING DRUM
Filed Feb. 26, 1958     3 Sheets-Sheet 1
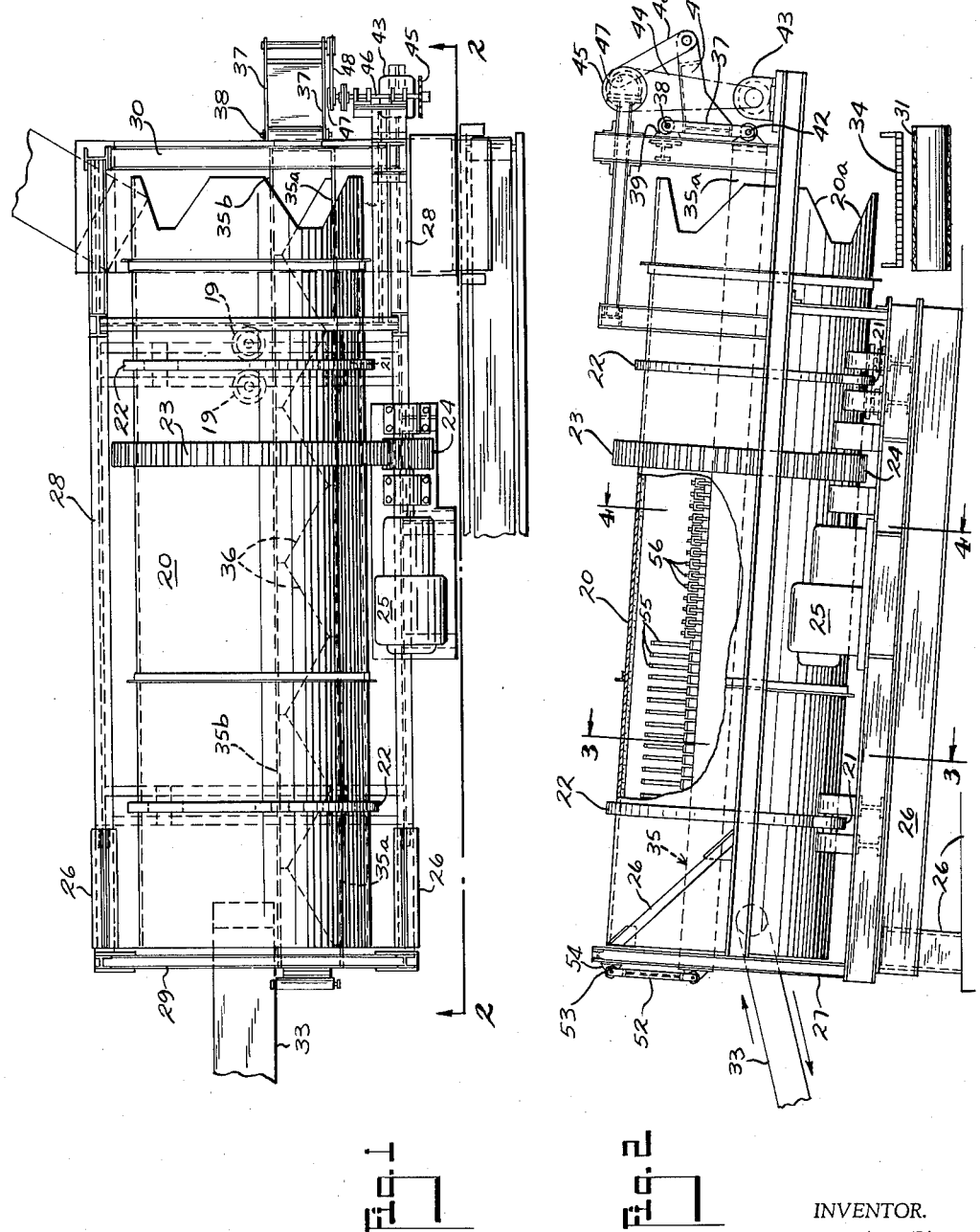
INVENTOR.
EINO R. MAKELA
BY
Hyde, Meyer, Baldwin & Doran
ATTORNEYS March 14, 1961  E. R. MAKELA  2,974,358
CUTTER MEANS FOR BALLING DRUM
Filed Feb. 26, 1958  3 Sheets-Sheet 2
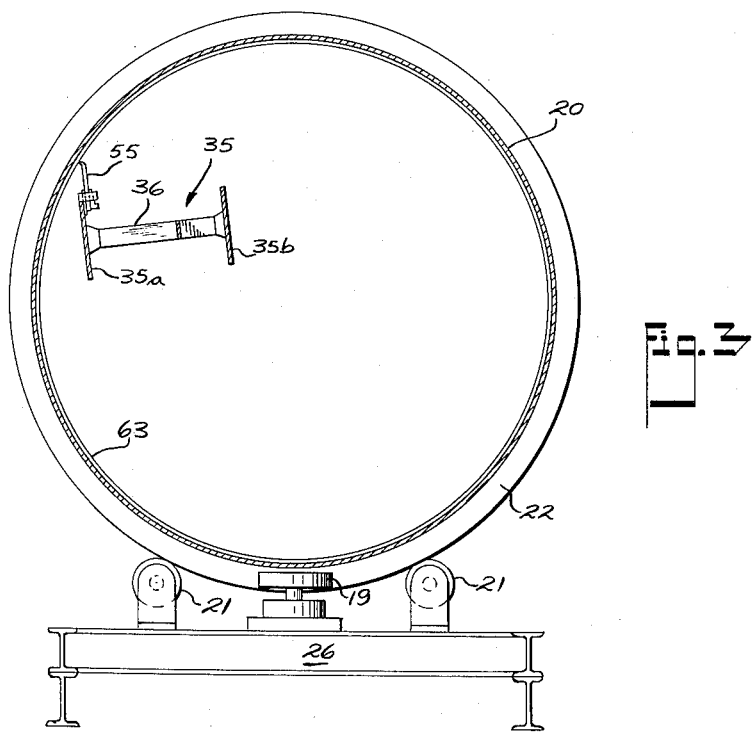
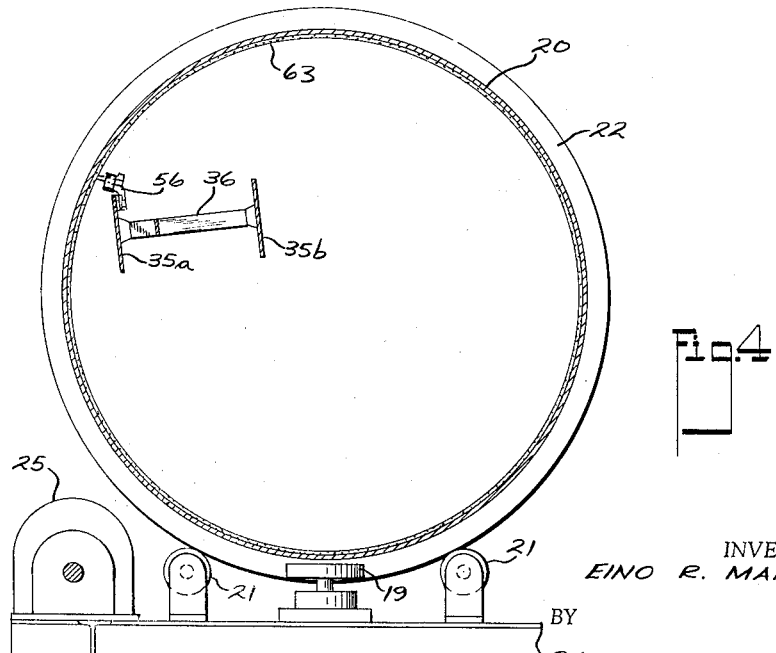
INVENTOR.
EINO R. MAKELA
BY
Hyde, Meyer, Baldwin & Doran
ATTORNEYS March 14, 1961   E. R. MAKELA   2,974,358
CUTTER MEANS FOR BALLING DRUM
Filed Feb. 26, 1958   3 Sheets-Sheet 3
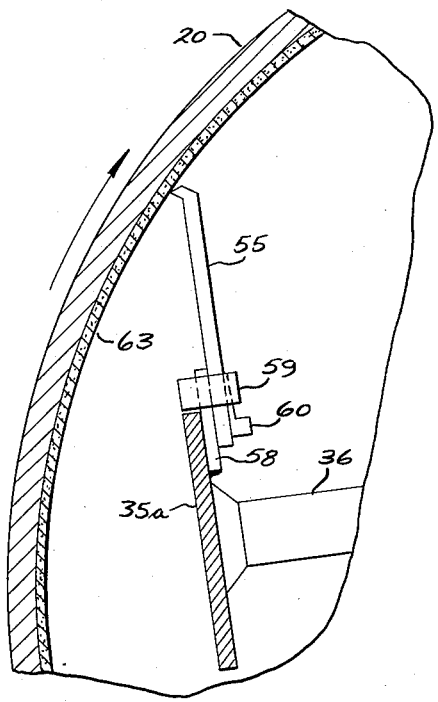
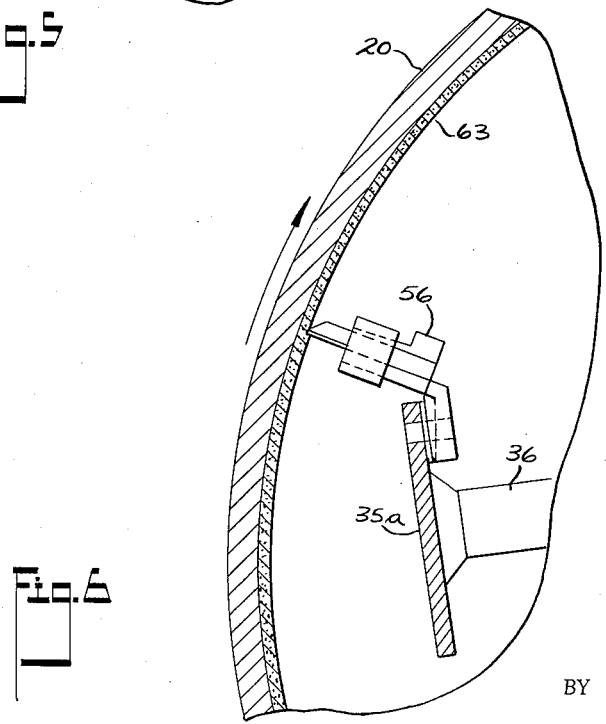
INVENTOR.
EINO R. MAKELA
BY
Hyde, Meyer, Baldwin & Doran
ATTORNEYS

United States Patent Office 2,974,358
Patented Mar. 14, 1961

2,974,358

CUTTER MEANS FOR BALLING DRUM

Eino R. Makela, Ely, Minn., assignor to Reserve Mining Company, Silver Bay, Minn., a corporation of Minnesota Filed Feb. 26, 1958, Ser. No. 717,619

3 Claims. (Cl. 18—1)

The invention relates to an improvement in balling drums for forming pellets, nodules, or small generally spherical balls from finely divided material such as beneficiated concentrate derived from ores such as taconite or the like.

As is known to those skilled in the mining and metallurgical arts there are certain low grade ferrous metal ores which must be up-graded by crushing, grinding, magnetic separation, and other steps, to raise the iron content of the ultimate, refined material to a value such that the concentrate can be efficiently reduced in the blast furnace. Since the normal concentrating processes ultimately produce a refined powder of the order of two hundred mesh, or thereabouts, it cannot be practically handled in a blast furnace since it would tend to block the interstices of the charge, or would travel out with the blast. It has been found that, for a number of reasons including the ones just mentioned, the concentrate is most efficiently handled by forming it into pellets of generally spherical contour, and preferably between one-half inch and one-and-one quarter inches in diameter. These pellets are formed from the refined, moist concentrate, the fresh soft pellets being thereafter indurated at a temperature between about 2000° F. and 2400° F. to impart sufficient hardness so that they can be handled and shipped without any material amount of crumbling.

The present invention deals with the apparatus generally termed a balling drum. This consists of a large cylindrical shell or drum which is mounted to rotate on a cylindrical axis slightly inclined to the horizontal, as will appear. The drum is open at both ends. The finely divided moist concentrate is charged into the higher end, and finished pellets are discharged from the lower end, the material progressing by gravity as the drum rotates. Since the material is moist and sticky (a binder is normally mixed with the concentrate) a layer of material adheres to the inner surface of the drum and the rest of the material, as it tumbles along, begins to "snowball," that is to say it develops nuclei which increase in size as they roll progressively along the drum. By proper control of a number of factors including rate of drum rotation, diameter of drum, amount of moisture and binder, and length of drum, the rate of progression of material through the drum, etc., the pellets issuing from the discharge end of the drum fall mostly within a preferred diameter range. By suitable screening devices at the discharge end the oversize and undersize product may be segregated and diverted for further corrective processing.

The thickness and surface contour of the concentrate coating layer adhering to the inner surface of the drum are important factors which govern pellet character and size. If the coating forms irregularly, or becomes too thick, large lumps will fall from the upper portion of the drum to the floor, thereby producing oversize pellets or irregular masses of concentrate, and also spoiling what would otherwise be well formed pellets.

An object of the present invention is to provide novel and improved means for controlling the thickness of the concentrate layer adhering to the drum, and also maintaining a uniform layer thickness, and a suitable surface.

Other objects and advantages will be apparent from a study of the following description of one embodiment of the invention, in conjunction with the accompanying drawings illustrating said embodiment, in which:

Fig. 1 is a top plan view of a balling drum embodying my invention.

Fig. 2 is a side elevational view as seen from the line 2—2 on Fig. 1, parts being broken away to reveal internal structure.

Figs. 3 and 4 are sectional views, somewhat enlarged, taken on the lines 3—3 and 4—4 of Fig. 2.

Fig. 5 is an enlarged detail view of a cutter tooth as seen in Fig. 3.

Fig. 6 is a view similar to Fig. 5, but showing another type of cutter tooth as shown in smaller size in Fig. 4.

Before specifically describing the balling drum structure here illustrated, it is to be understood that the invention here involved is not limited to the structural details or the particular arrangement of parts here shown, as apparatus involving the present invention may take other forms. It also is to be understood that the terminology or phraseology herein used is for purposes of description, and not of limitation, as the scope of the present invention is denoted by the appended claims.

Referring now to the drawings, and particularly for the time being to Figs. 1 and 2, I show an elongated cylindrical drum 20 rotatably supported on two or more pairs of spaced idler rollers 21 (Figs. 3 and 4). The drum position is maintained by means of a pair of idler sheaves 19 which bear against opposite side edges of tracks 22. A large ring gear 23 is fixed on the drum, and is in mesh with a pinion 24 which is driven from a motor 25 through suitable reduction gearing. The drum is supported by a conventional base 26, and upright column members 27 which need not be described in detail since they are conventional. Two laterally spaced side beams 28 and end cross beams 29 and 30 support operating mechanisms to be described later.

Material to be pelletized arrives in comminuted form on conveyor 33 at the higher end of the drum, which is inclined at a predetermined angle as shown in Fig. 2, and is discharged in pellet form onto a screen 34 at the lower end of the drum. The right end of the drum is scalloped at 20a to improve distribution of the pellets on the vibrating screen 34 which separates undersized pellets or fragments thereof. The overburden from the screen, representing the usable pellets, is carried away on a conveyor 31.

The invention here involved relates particularly to a cutter bar assembly 35 which extends longitudinally completely through the drum 20. Referring to Figs. 1, 2 and 3 the cutter bar in the present instance consists of a pair of parallel plates 35a and 35b held in spaced relationship by zig-zag braces 36. This affords the best combination of strength and relatively light weight, but of course other designs could easily be substituted.

The purpose of the cutter bar is to support a plurality of cutting teeth which will be described in detail hereinbelow. The scraper bar reciprocates longitudinally adjacent to the inner surface of the drum, and the teeth contact the layer of concentrate adhering to the drum surface and maintain said layer at a predetermined thickness.

Still referring to Figs. 1 and 2 the cutter bar is reciprocated by a modified bell-crank linkage comprising spaced rocker arms 37 swingable on a fixed axis 38, supported on a pillow block 39 carried on a transverse frame member. The lower end of lever 37 is pivotally attached, at 42, to cutter bar 35. A motor 43 is carried on the frame member 28, and through chain belt 44 it rotates a sprocket 45 which, through a shaft 46 rotates a disk 47. A link 48 is eccentrically pivotally mounted on disc 47 and the other end of link 48 is pivotally attached to an arm 49 of plate-like character which is fixed to the rocker arm 37. Rotation of sprocket 45 therefore rotates disc 47 and operates link 48 to rock arms 49 and 37 around pivot 38. It will be apparent that this reciprocates cutter bar 35 because the other end of said cutter bar is pivotally attached to a rocker arm 52 which is pivoted at 52 on a pillow block 54 fixed on frame member 29. Endwise reciprocation of cutter bar 35 covers, in the present instance, a span of about six inches.

The purpose of the cutter bar is to carry certain cutter teeth elements 55 and 56, the separate reference numeral designations being applied to two types of cutter teeth units, as will appear from a glance at Figs. 2, 5 and 6.

The moist sticky concentrate is discharged into the left end of the drum (Figs. 1 and 2) and it is in this zone that there is the greatest tendency for the concentrate to form in oversized masses which fall to the bottom of the drum. In this charging zone I have disposed a row of substantially vertical cutters 55 as best shown in Figs. 3 and 5. These cutter teeth need not be exactly vertical, but should be inclined upwardly at an angle greater than the critical angle of slip of the concentrate so that no concentrate material will adhere thereto. The cutter bar plate 35a carries a series of lugs 58 welded thereto which extend somewhat above the top edge of plate 35a. By means of a box clamp 59 and wedge 60 a cutter tooth 55 is firmly attached to each lug. This type of tooth and its mounting is of particular advantage in the charging zone. These cutter teeth are disposed to maintain a layer 63 of concentrate on the inner wall of drum 20 of such thickness that it functions properly in the pelletizing operation without developing a tendency to peel off. As the drum rotates the cutter bar and its teeth reciprocate to produce a relatively even internal surface, and cause any excess material to fall past the cutter bar. The plurality of teeth and the span of reciprocation thoroughly cover the surface and prevent build-up of excess concentrate. The particular angular inclination of teeth 55 in the charging zone prevents any substantial formation of masses of material on either the teeth or the cutter bar. The open structure of the cutter bar is likewise not conducive to build-up of concentrate on the cutter bar.

As best seen at the broken-away portion of Fig. 2, in the present illustrated embodiment the row of vertical teeth extends only part way into the drum. From this point onward I have disposed teeth 56 which are directed at a greater angular inclination than teeth 55, and they are secured and clamped to projecting lugs in any suitable way. Teeth 56 cooperate with teeth 55 in shaving successive layers of excessive material from the concentrate. The inclination of the mounting means for teeth 56 would afford a seat for falling material except that they are arranged in a zone which is spaced further away from the charging end of the drum and the problem of building up on the drum is not so severe.

The most significant feature of the invention is the use of the substantially vertical cutter teeth 55 and all of the cutter teeth in the drum could be arranged in this manner, if desired. Another useful feature is the openwork structure of the cutter bar, with all major planar areas being disposed substantially vertically whereby to afford the least possible transverse area for the formation of undesired masses of concentrate.

What I claim is:

1. In an open-ended, rotatable, cylindrical balling drum wherein relatively adhesive comminuted material is charged into a charging end of the drum, and is discharged from a discharging end of the drum, and wherein a layer of said material adheres to the inner surface of the drum, means for uniformly controlling the thickness of said adhering layer comprising an elongated member extending through said drum parallel to the drum axis, means for reciprocating said member endwise parallel to and adjacent to an inner surface of the drum, and a plurality of cutter elements fixed on said member and extending towards and contactable with the inner surface of said layer, said cutter elements being disposed to extend upwardly from said reciprocating member at an angle to the horizontal greater than the critical angle of slip of said comminuted material.

2. Apparatus as defined in claim 1 wherein said cutter elements are grouped in a zone adjacent to the charging end of the drum.

3. In an open-ended, rotatable, cylindrical balling drum of the character described wherein relatively adhesive comminuted material is charged into a higher, charging end of the drum, and is discharged in pelletized form from a lower, discharging end of the drum, and wherein a layer of said material adheres to the inner surface of the drum, means for uniformly controlling the thickness of said adhering layer comprising an elongated member extending through said drum in a direction parallel to the drum axis from said charging end towards said discharging end, means for reciprocating said member endwise and parallel to and adjacent to an inner surface portion of the drum, and a plurality of cutter elements disposed along said member, each element having a tip portion thereof spaced a predetermined minor distance from the inner drum surface whereby to scrape excess comminuted material from said layer as the member reciprocates and the drum rotates, the cutter elements near said charging end being arranged to extend upwardly from said reciprocating member at an angle to the horizontal greater than the critical angle of slip of the material, and the member of such upwardly extending cutter elements being sufficient to appreciably reduce buildup of comminuted material.

References Cited in the file of this patent

UNITED STATES PATENTS

| | | |
|---|---|---|
| 2,778,056 | Wynne | Jan. 22, 1957 |
| 2,831,210 | DeVaney | Apr. 22, 1958 |

FOREIGN PATENTS

| | | |
|---|---|---|
| 181,807 | Australia | Apr. 25, 1955 |
| 1,050,749 | France | Jan. 11, 1954 |
| 83,762 | Norway | Apr. 3, 1954 |